US011151025B1

(12) United States Patent
Gupta

(10) Patent No.: US 11,151,025 B1
(45) Date of Patent: Oct. 19, 2021

(54) GENERATING SOFTWARE TEST PLANS BASED AT LEAST IN PART ON MONITORED TRAFFIC OF A PRODUCTION APPLICATION

(71) Applicant: Dell Products L.P., Round Rock, TX (US)

(72) Inventor: Shubham Gupta, Jaipur (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/875,146

(22) Filed: May 15, 2020

(51) Int. Cl.
*G06F 11/36* (2006.01)
*H04L 29/08* (2006.01)

(52) U.S. Cl.
CPC ...... *G06F 11/3688* (2013.01); *G06F 11/3684* (2013.01); *H04L 67/02* (2013.01)

(58) Field of Classification Search
CPC ............. G06F 11/3688; G06F 11/3684; H04L 67/02–025
USPC ................................................. 717/124–167
See application file for complete search history.

(56) References Cited

U.S. PATENT DOCUMENTS

| | | | | |
|---|---|---|---|---|
| 6,408,403 | B1 * | 6/2002 | Rodrigues | G06F 11/3688 714/38.11 |
| 9,672,137 | B1 | 6/2017 | Allocca et al. | |
| 2003/0196190 | A1 * | 10/2003 | Ruffolo | G06F 11/3684 717/124 |
| 2004/0073890 | A1 * | 4/2004 | Johnson | G06F 11/3672 717/124 |
| 2005/0283457 | A1 | 12/2005 | Sonkin et al. | |
| 2009/0240765 | A1 * | 9/2009 | Wiles, Jr. | H04L 67/02 709/203 |
| 2011/0126197 | A1 * | 5/2011 | Larsen | G06F 9/455 718/1 |
| 2011/0145795 | A1 * | 6/2011 | Khanapurkar | G06F 11/3466 717/126 |

OTHER PUBLICATIONS

Cohen, David M., et al. "The AETG system: An approach to testing based on combinatorial design." IEEE Transactions on Software Engineering 23.7 (1997): pp. 437-444. (Year: 1997).*

(Continued)

*Primary Examiner* — Satish Rampuria
(74) *Attorney, Agent, or Firm* — Ryan, Mason & Lewis, LLP

(57) ABSTRACT

An apparatus comprises a processing device configured to monitor traffic associated with a production application in a production environment of a software development platform, to generate software testing plans based on the monitored traffic, to identify software code to be tested for an updated version of the production application, and to select one or more of the software testing plans for testing the identified software code in a staging environment prior to integration testing in an integration testing environment of the software development platform. The processing device is also configured to perform the selected software testing plans on the identified software code in the staging environment, and to deploy the identified software code in the updated version of the production application in the integration testing environment based at on results of performing the selected software plans on the identified software code in the staging.

20 Claims, 6 Drawing Sheets

(56) References Cited

OTHER PUBLICATIONS

Križanić, J., et al. "Load testing and performance monitoring tools in use with AJAX based web applications." The 33rd International Convention MIPRO. IEEE, 2010.pp. 428-434 (Year: 2010).*

Holopov, V., et al. "Development of digital production engineering monitoring system based on equipment state index." 2017 IEEE Conference of Russian Young Researchers in Electrical and Electronic Engineering (ElConRus). IEEE, 2017.pp. 863-868 (Year: 2017).*

Rolfsnes, Thomas. "Mining change history for test-plan generation (doctoral symposium)." Proceedings of the 2015 International Symposium on Software Testing and Analysis. 2015.pp. 444-447 (Year: 2015).*

Leung, Hareton KN, and Lee White. "Insights into regression testing (software testing)." Proceedings. Conference on Software Maintenance—1989. IEEE, 1989.pp. 60-69 (Year: 1989).*

Mihajlović, Zorica, and Dušan Velašević. "A knowledge-based test plan generator for incremental unit and integration software testing." Software Testing, Verification and Reliability 8.4 (1998): pp. 191-211. (Year: 1998).*

Disruptive Library Technology Jester, "Traditional Development/Integration/Staging/Production Practice for Software Development," https://dltj.org/article/software-development-practice/, Dec. 4, 2006, 5 pages.

* cited by examiner

GENERATING SOFTWARE TEST PLANS BASED AT LEAST IN PART ON MONITORED TRAFFIC OF A PRODUCTION APPLICATION

FIELD

The field relates generally to information processing, and more particularly to techniques for managing software development.

BACKGROUND

Software development processes typically include multiple environments, such as one or more development environments, an integration testing environment, a staging environment, and a production environment. New software code may be created by individual developers or small teams of developers in respective ones of the development environments. The integration environment provides a common environment where software code from the multiple developers is combined and tested before being provided to the staging environment. The staging environment is designed to emulate the production environment and may be used for final review and approval before new software code is deployed in production applications in the production environment.

SUMMARY

Illustrative embodiments of the present invention provide techniques for generating software testing plans based at least in part on monitored traffic from production applications.

In one embodiment, an apparatus comprises at least one processing device comprising a processor coupled to a memory. The at least one processing device is configured to perform the steps of monitoring traffic associated with a production application in a production environment of a software development platform, generating software testing plans based at least in part on the monitored traffic, and identifying software code to be tested for an updated version of the production application. The at least one processing device is also configured to perform the step of selecting one or more of the software testing plans for testing the identified software code in a staging environment of the software development platform prior to integration testing of the updated version of the production application in an integration testing environment of the software development platform. The at least one processing device is further configured to perform the steps of performing the selected one or more software testing plans on the identified software code in the staging environment of the software development platform and deploying the identified software code in the updated version of the production application in the integration testing environment of the software development platform based at least in part on results of performing the selected one or more software plans on the identified software code in the staging environment of the software development platform.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
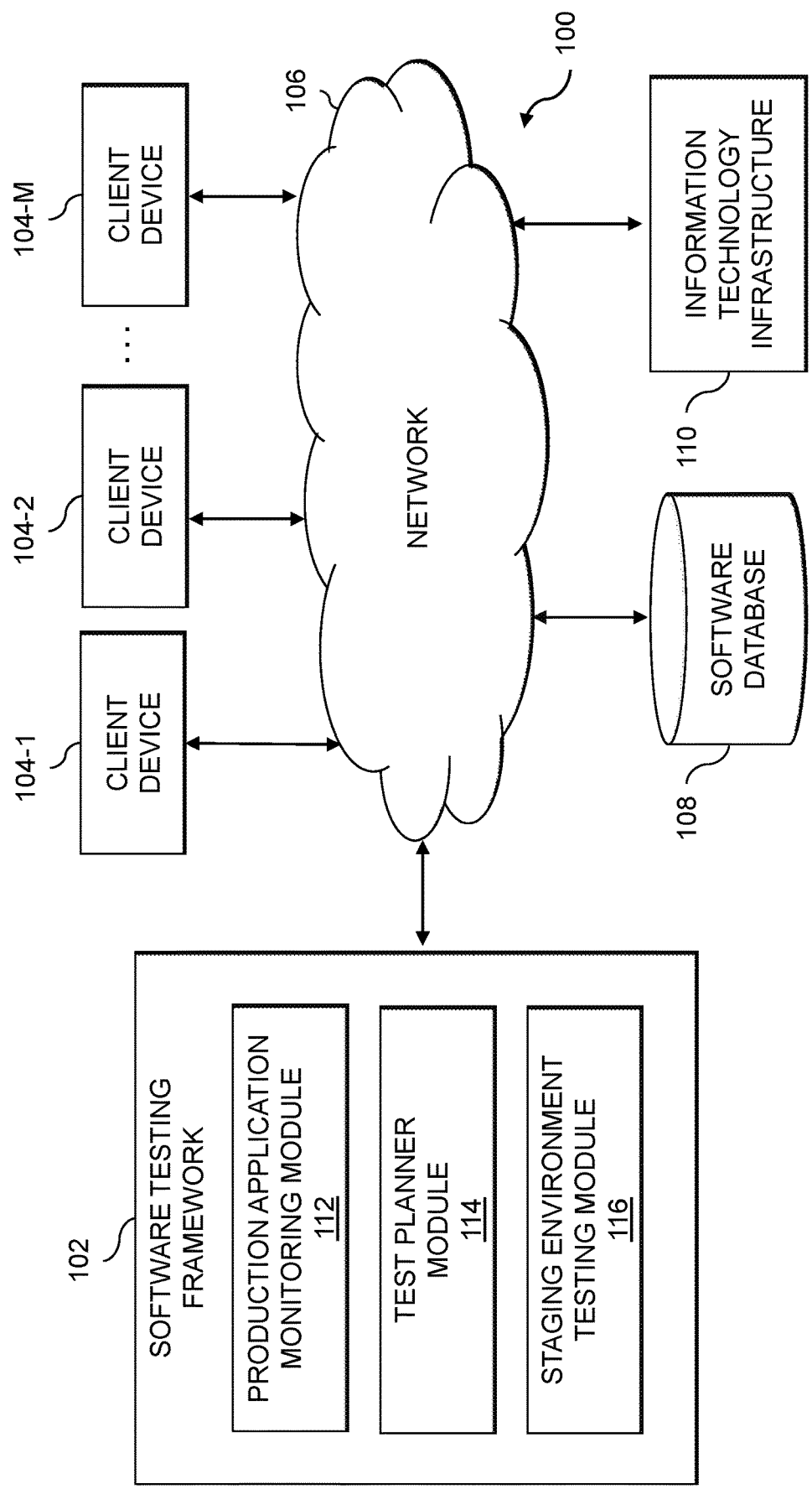
FIG. 1 is a block diagram of an information processing system with a software testing framework for generating software testing plans based at least in part on monitored traffic from production applications in an illustrative embodiment of the invention.

FIG. 1 shows an information processing system 100 configured in accordance with an illustrative embodiment. The information processing system 100 is assumed to be built on at least one processing platform and provides functionality for generating software testing plans based at least in part on monitored traffic from production applications. The information processing system 100 includes a software testing framework 102 and a plurality of client devices 104-1, 104-2, . . . 104-M (collectively client devices 104). The software testing framework 102 and client devices 104 are coupled to a network 106. Also coupled to the network 106 is a software database 108, which may store various information relating to software that is utilized by or otherwise associated with a plurality of assets of information technology (IT) infrastructure 110 also coupled to the network 106. The assets may include, by way of example, physical and virtual computing resources in the IT infrastructure 110. Physical computing resources may include physical hardware such as servers, storage systems, networking equipment, Internet of Things (IoT) devices, other types of processing and computing devices, etc. Virtual computing resources may include virtual machines (VMs), software containers, etc.

The assets of the IT infrastructure 110 (e.g., physical and virtual computing resources thereof) may host applications that are utilized by respective ones of the client devices 104, such as in accordance with a client-server computer program architecture. In some embodiments, the applications comprise web applications designed for delivery from assets in the IT infrastructure 110 to users (e.g., of client devices 104) over the network 106. Various other examples are possible, such as where one or more applications are used internal to the IT infrastructure 110 and not exposed to the client devices 104. It should be appreciated that, in some embodiments, some of the assets of the IT infrastructure 110 may themselves be viewed as applications or more generally software that is to be tested. For example, virtual computing resources implemented as software containers may represent software being tested by the software testing framework 102 in some embodiments.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, software containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The software database 108, as discussed above, is configured to store and record information relating to software testing of applications. Such applications may be hosted by assets of the IT infrastructure 110 (e.g., some applications being tested may comprise web applications that utilize a client-server program architecture where the client runs in a web browser on one of the client devices 104 and the server runs on one or more of the assets in the IT infrastructure 110, etc.). The applications may also run on assets of the IT infrastructure 110, or may be developed in the IT infrastructure 110 and provided to client devices 104 for use (e.g., through an application store or other marketplace), etc. The software database 108, in some embodiments, provides a code base that allows developers to check in new code for applications that is to be tested using the software testing framework 102. The software database 108 may further or alternatively store information regarding use of production applications (e.g., by the client devices 104, by assets of the IT infrastructure 110, etc.) so as to determine sequences of requests and responses that characterize use of the production applications. Such information may be maintained in the software database 108 for use in generating test patterns and scenarios for new code and features of applications (e.g., new or updated versions of production applications) before they are deployed for use. Various other information may be stored in the software database 108 in other embodiments as discussed in further detail below.

The software database 108 in some embodiments is implemented using one or more storage systems or devices associated with the software testing framework 102. In some embodiments, one or more of the storage systems utilized to implement the software database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the software testing framework 102, as well as to support communication between the software testing framework 102 and other related systems and devices not explicitly shown.

The client devices 104 are configured to access or otherwise utilize assets of the IT infrastructure 110 (e.g., applications that are running on or hosted by such assets). One or more of the client devices 104 may in some cases be operated by software developers that create new software code for such applications that is to be tested using the software testing framework 102. In some embodiments, the assets (e.g., physical and virtual computing resources) of the IT infrastructure 110 are operated by or otherwise associated with one or more companies, businesses, organizations, enterprises, or other entities. For example, in some embodiments the assets of the IT infrastructure 110 may be operated by a single entity, such as in the case of a private data center of a particular company. In other embodiments, the assets of the IT infrastructure 110 may be associated with multiple different entities, such as in the case where the assets of the IT infrastructure 110 provide a cloud computing platform or other data center where resources are shared amongst multiple different entities.

The term "user" herein is intended to be broadly construed so as to encompass numerous arrangements of human, hardware, software or firmware entities, as well as combinations of such entities.

In the present embodiment, alerts or notifications generated by the software testing framework 102 are provided over network 106 to client devices 104, or to a system administrator, IT manager, or other authorized personnel via one or more host agents. Such host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the software testing framework 102. For example, a given host agent may comprise a mobile telephone equipped with a mobile application configured to receive alerts or notifications from the software testing framework 102 (e.g., when testing of new software passes or fails, when new software is deployed for use, etc.). The given host agent provides an interface for responding to such various alerts or notifications as described elsewhere herein.

It should be noted that a "host agent" as this term is generally used herein may comprise an automated entity, such as a software entity running on a processing device. Accordingly, a host agent need not be a human entity.

The software testing framework 102 in the FIG. 1 embodiment is assumed to be implemented using at least one processing device. Each such processing device generally comprises at least one processor and an associated memory, and implements one or more functional modules for controlling certain features of the software testing framework 102. In the FIG. 1 embodiment, the software testing framework 102 comprises a production application monitoring module 112, a test planner module 114, and a staging environment testing module 116.

The production application monitoring module 112 is configured to monitor traffic associated with a production application in a production environment of a software development platform. The monitored traffic may comprise requests submitted by client devices 104 to production applications running in the IT infrastructure 110, as well as responses to such requests that are sent from the production applications running in the IT infrastructure 110 to the client devices 104.

The test planner module 114 is configured to generate software testing plans based at least in part on the monitored traffic. In some embodiments, this includes clustering requests and responses in the monitored traffic according to some designated characteristics (e.g., HyperText Transfer Protocol (HTTP) status codes) and using requests and responses in the different clusters to develop different types of tests (e.g., to test normal application behavior, failure scenarios, etc.). One or more of the generated software plans may include replaying requests sent to the production application to a test application (e.g., that includes software code to be tested, such as for an updated version of the production application), and determining whether the responses to such requests sent from the test application match expected responses (e.g., where the expected responses are determined based at least in part on the actual responses from the production application in the monitored traffic).

The test planner module 114 is further configured to identify software code to be tested for an updated version of the production application, and to select one or more of the software testing plans for testing the identified software code in a staging environment of the software development platform prior to integration testing of the updated version of the production application in an integration testing environment of the software development platform. The staging environment testing module 116 is configured to perform the selected one or more software testing plans on the identified software code in the staging environment of the software development platform, and to deploy the identified software code in the updated version of the production application in the integration testing environment of the software development platform based at least in part on results of performing the selected one or more software plans on the identified software code in the staging environment of the software development platform.

It is to be appreciated that the particular arrangement of the software testing framework 102, client devices 104, software database 108 and IT infrastructure 110 illustrated in the FIG. 1 embodiment is presented by way of example only, and alternative arrangements can be used in other embodiments. For example, the software testing framework 102, or one or more portions thereof such as the production application monitoring module 112, the test planner module 114, and the staging environment testing module 116, may in some embodiments be implemented internal to one or more of the client devices 104 or the IT infrastructure 110. As another example, the functionality associated with the production application monitoring module 112, the test planner module 114, and the staging environment testing module 116 may be combined into one module, or separated across more than three modules with the multiple modules possibly being implemented with multiple distinct processors or processing devices.

At least portions of the production application monitoring module 112, the test planner module 114, and the staging environment testing module 116 may be implemented at least in part in the form of software that is stored in memory and executed by a processor.

It is to be understood that the particular set of elements shown in FIG. 1 for generating software testing plans based at least in part on monitored traffic from production applications is presented by way of illustrative example only, and in other embodiments additional or alternative elements may be used. Thus, another embodiment may include additional or alternative systems, devices and other network entities, as well as different arrangements of modules and other components.

The software testing framework 102 may be part of or otherwise associated with another system, such as a governance, risk and compliance (GRC) system, a security operations center (SOC), a critical incident response center (CIRC), a security analytics system, a security information and event management (SIEM) system, etc.

The software testing framework 102, and other portions of the system 100, in some embodiments, may be part of cloud infrastructure as will be described in further detail below. The cloud infrastructure hosting the software testing framework 102 may also host any combination of the software testing framework 102, one or more of the client devices 104, the software database 108 and the IT infrastructure 110.

The software testing framework 102 and other components of the information processing system 100 in the FIG. 1 embodiment, are assumed to be implemented using at least one processing platform comprising one or more processing devices each having a processor coupled to a memory. Such processing devices can illustratively include particular arrangements of compute, storage and network resources.

The client devices 104 and software testing framework 102 or components thereof (e.g., the production application monitoring module 112, the test planner module 114, and the staging environment testing module 116) may be implemented on respective distinct processing platforms, although numerous other arrangements are possible. For example, in some embodiments at least portions of the software testing framework 102 and one or more of the client devices 104 are implemented on the same processing platform. A given client device (e.g., 104-1) can therefore be implemented at least in part within at least one processing platform that implements at least a portion of the software testing framework 102. Similarly, at least a portion of the software testing framework 102 may be implemented at least in part within at least one processing platform that implements at least a portion of the IT infrastructure 110.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the software testing framework 102, the client devices 104, the software database 108 and the IT infrastructure 110, or portions or components thereof, to reside in different data centers. Numerous other distributed implementations are possible. The software testing framework 102 can also be implemented in a distributed manner across multiple data centers.

Additional examples of processing platforms utilized to implement the software testing framework 102 in illustrative embodiments will be described in more detail below in conjunction with FIGS. 5 and 6.

It is to be appreciated that these and other features of illustrative embodiments are presented by way of example only, and should not be construed as limiting in any way.

Figure 2:
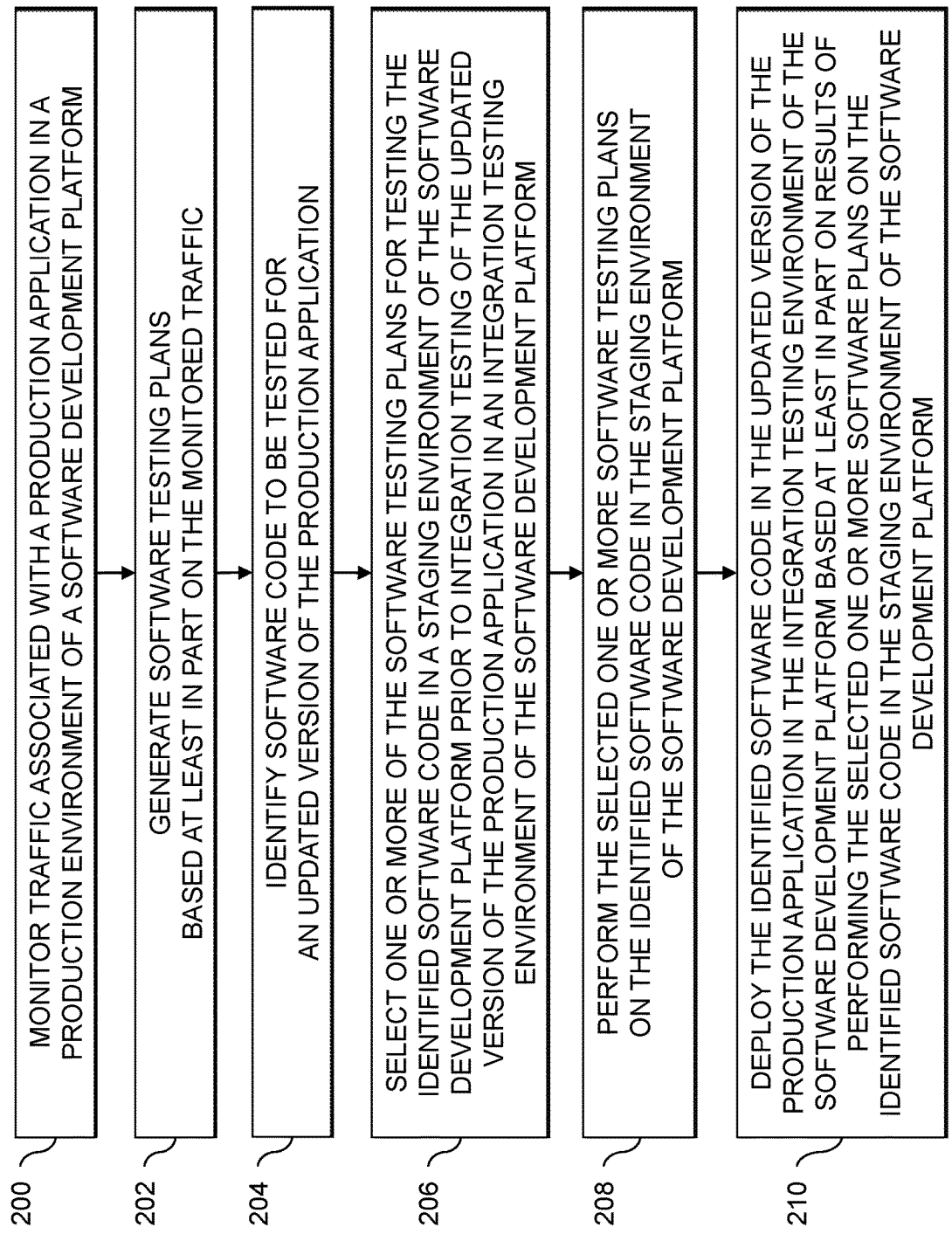
FIG. 2 is a flow diagram of an exemplary process for generating software testing plans based at least in part on monitored traffic from production applications in an illustrative embodiment.

An exemplary process for generating software testing plans based at least in part on monitored traffic from production applications will now be described in more detail with reference to the flow diagram of FIG. 2. It is to be understood that this particular process is only an example, and that additional or alternative processes for generating software testing plans based at least in part on monitored traffic from production applications can be carried out in other embodiments.

In this embodiment, the process includes steps 200 through 210. These steps are assumed to be performed by the software testing framework 102 utilizing the production application monitoring module 112, the test planner module 114, and the staging environment testing module 116. The process begins with step 200, monitoring traffic associated with a production application in a production environment of a software development platform. Software testing plans are generated based at least in part on the monitored traffic in step 202. Software code to be tested (e.g., for an updated version of the production application) is identified in step 204.

In step 206, one or more of the software testing plans generated in step 202 are selected for use in testing the software code identified in step 204 within a staging environment of the software development platform prior to integration testing of the updated version of the production application in an integration testing environment of the software development platform. The selected one or more software testing plans are performed on the identified software code in the staging environment of the software development platform in step 208. In step 210, the identified software code is deployed in the updated version of the production application in the integration testing environment of the software development platform based at least in part on results of performing the selected one or more software plans on the identified software code in the staging environment of the software development platform.

In some embodiments, the traffic monitored in step 200 includes a plurality of requests sent to the production application and a plurality of responses sent from the production application, and the one or more software testing plans selected in step 206 comprise a set of test requests corresponding to at least a subset of the plurality of requests sent to the production application and a set of expected responses corresponding to at least a subset of the plurality of responses sent from the production application. The results of performing the selected one or more software plans on the identified software code in the staging environment (e.g., utilized for determining whether to deploy the identified software code in the updated version of the production application in the integration testing environment of the software development platform in step 210) indicate whether actual responses to the set of test requests differ from the set of expected responses.

Step 200 may include clustering requests sent to the production application and responses sent from the production application into a plurality of categories, and step 202 may include generating software testing plans for each of the plurality of categories. The requests and responses may be clustered into the plurality of categories based at least in part on HTTP status codes of the requests and responses. The plurality of categories may comprise: a first category comprising successful requests and responses, the first category being utilized to generate one or more software testing plans for testing normal operation of an application; a second category comprising unauthorized requests and responses, the second category being utilized to generate one or more software testing plans for testing against security standards; a third category comprising requests and responses with inappropriate request payload, the third category being utilized to generate one or more software testing plans for testing failure scenarios; a fourth category comprising requests and responses where a path is not found, the fourth category being utilized to generate one or more software testing plans for testing failure scenarios; a fifth category comprising requests and responses where an internal error occurred, the fifth category being utilized to generate one or more software testing plans for testing for resiliency and associated failure scenarios; etc.

Step 208 may include replaying, in a test staging application in the staging environment, one or more requests sent to the production application in the monitored traffic. Step 208 may further include identifying regression defects in the identified software code based at least in part on determining whether responses to the replayed one or more requests from the test staging application in the staging environment differ from corresponding responses in the monitored traffic sent from the production application in the production environment. Step 206 may include selecting the replayed one or more requests to capture one or more designated types of regression defects based at least in part on a type of testing being performed on the identified software code. The one or more designated types of regression defects may comprise: data variations for unit or functional testing of the identified software code; structure variations for contract testing of the identified software code; status code type variations for unit or functional testing of the identified software code; etc.

Replaying the one or more requests in the test staging application in the staging environment may comprise: dropping a subset of requests in the monitored traffic sent to the production application; adjusting a rate at which requests in the monitored traffic sent to the production application are replayed in the test staging application; looping replay of a set of two or more requests in the monitored traffic sent to the production application in the test staging application; etc. The one or more requests replayed in the test staging application in the staging environment may be selected from the monitored traffic based at least in part on dropping random requests from the monitored traffic, dropping a fraction of requests from the monitored traffic, applying one or more filters to the monitored traffic, etc. The one or more requests replayed in the test staging application in the staging environment may comprise modified versions of requests from the monitored traffic.

Quality and stability are some of the key areas that software development teams keep track of across releases of a particular piece of software (e.g., an application). To maintain quality and stability, software development teams (e.g., including Software Development Engineers in Test (SDETs), Quality Engineers (QEs), testers, etc.) may continuously tests for bugs, defects and other issues in new software features to be added (e.g., perform feature testing) and in existing deployed software features (e.g., regression testing). In some embodiments, this performed in accordance with a continuous integration and continuous deployment (CI/CD) software development process. Software development teams may also write and maintain various functional tests, unit tests, contract tests, integration tests, etc., so as to verify and re-verify new and existing functionality.

The whole process of enabling automation in software development and maintaining test cases (or doing manual testing) faces scalability issues for bigger systems and, moreover, consumes significant resources (e.g., actual feature development time) for each release. Thus, traditional testing frameworks have significant challenges and drawbacks. Traditional testing frameworks, for example, may require manual testing which requires significant effort and time, or utilizes automation where software developers must write and maintain long and lengthy test cases. Similar effort must also be expended by SDETs, as well as other members of a software development team that build and maintain functional test cases. Thus, there is a need for an automated software testing tool that can aid software development teams at multiple testing levels to accomplish software testing more efficiently and effectively. Such an automated software testing tool will enable software developers to focus more time and effort on new feature development. The automated software testing tool can further allow QEs of the software development team to focus more time and effort on new features and edge-case testing.

In some embodiments, an automated software testing tool can meet these and other issues (e.g., such as the issues associated with regression testing) by creating an intelligent and self-aware system that will eliminate the need to write and maintain test cases from a development perspective, as well as eliminate the need for regression testing (e.g., manual or automated) done by QEs. As such, the problem of test data set-up, similar to production, may be completely avoided.

Figure 3:
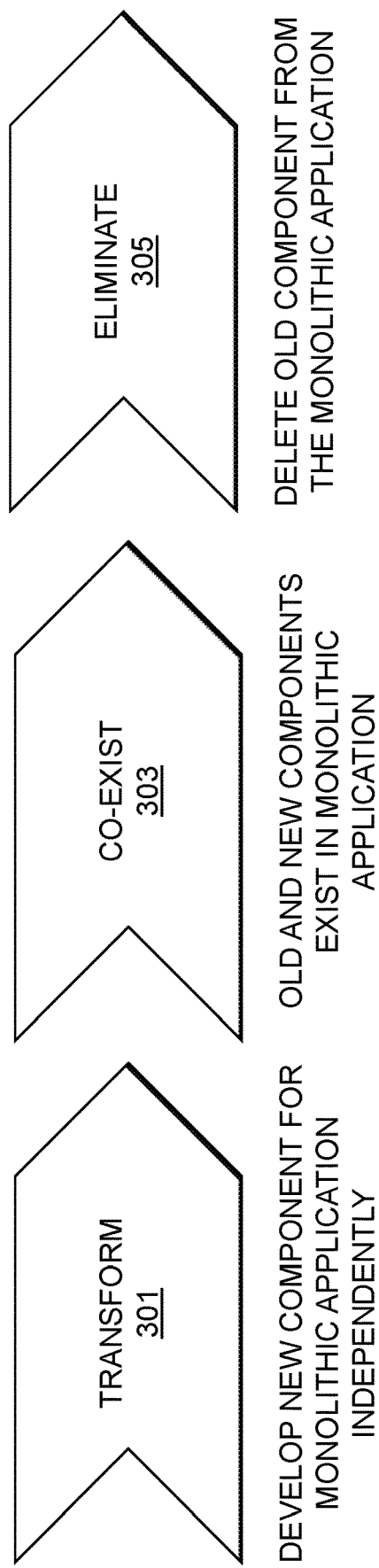
FIG. 3 shows a process flow for incrementally updating a monolithic software application in an illustrative embodiment.

The automated software testing tool solution in some embodiments utilizes aspects of the "strangler design pattern" which provides techniques for incrementally migrating a legacy system by gradually replacing specific pieces of functionality with new applications and services (e.g., microservices). As features from the legacy system are replaced, the new system eventually replaces all of the old system's features, thereby "strangling" the old system and allowing it to be decommissioned. FIG. 3 illustrates such an approach for incrementally updating a monolithic software application, including a transform stage 301, a co-exist stage 303, and an eliminate stage 305. During the transform stage 301, new components are developed for the monolithic application independently. In the co-exist stage 303, old and new components exist in the monolithic application. In the eliminate stage 305, the old components are deleted from the monolithic application. The automated software testing tool, in some embodiments, may be used to aid or supplement existing testing processes rather than replace such processes entirely.

Figure 4:
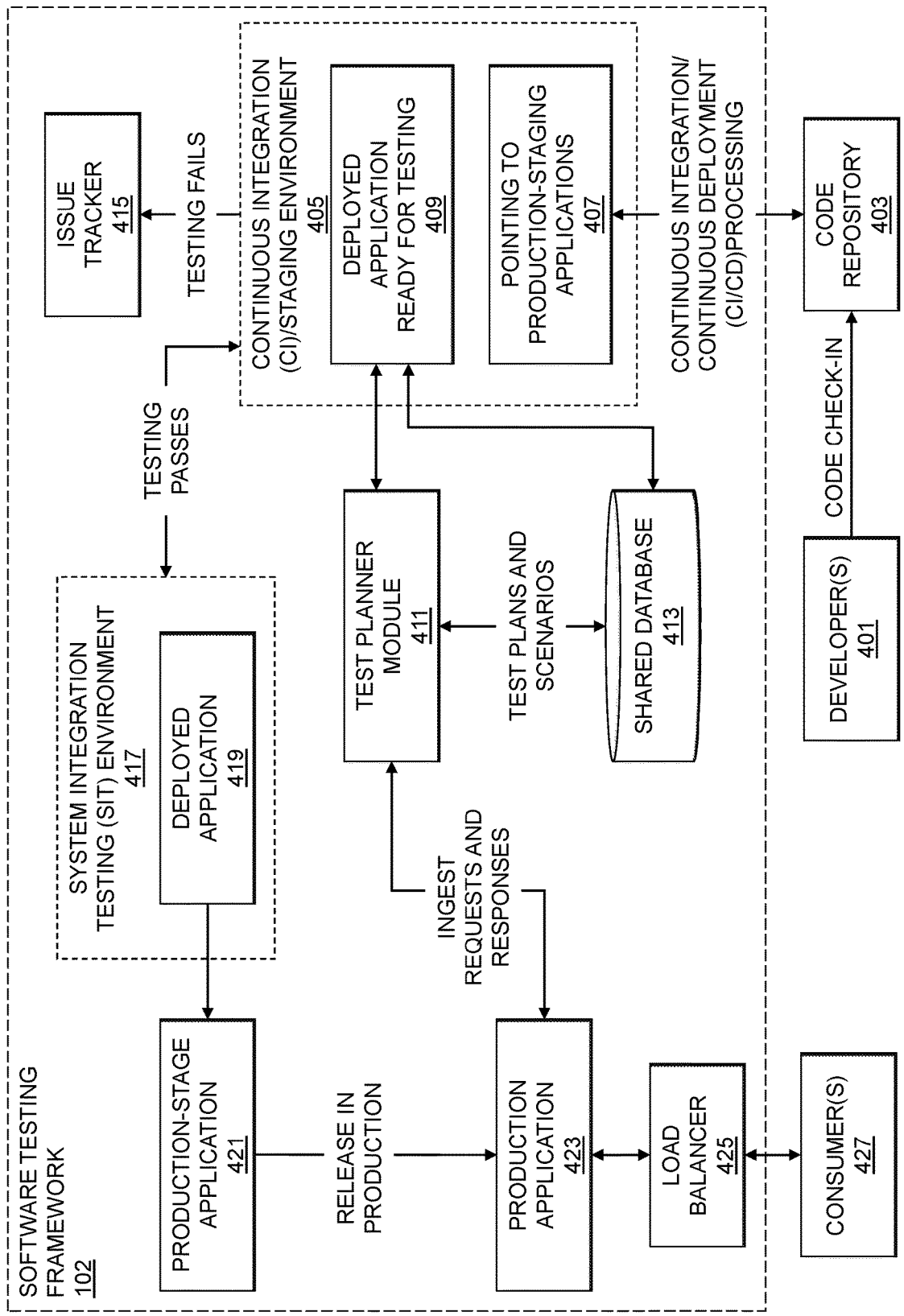
FIG. 4 shows a process flow in a software testing framework in an illustrative embodiment.

FIG. 4 illustrates a system process flow that may be implemented using the software testing framework 102. As shown, one or more software developers 401 may check code in to a code repository 403 (e.g., which may be a part of the software database 108 described above). The code check-in may be for new features of an application that are to be tested before being deployed in a production environment. Checking-in code to the code repository 403, in some embodiments, may initiate or trigger CI/CD processing. A continuous integration (CI)/staging environment 405 provides pointers from the checked-in code to production-staging applications in block 407, and provides the checked-in code to deployed applications ready for testing in block 409. A deployed application ready for testing in the CI/staging environment 405 as also referred to as test staging application 409.

The CI/staging environment 405 will obtain test plans and scenarios for the test staging application 409 from test planner module 411. The test planner module 411 ingests (e.g., monitors) requests and responses (e.g., for a production application 423) and uses the ingested requests and responses to develop test plans and scenarios stored in a shared database 413 (e.g., which may be part of the software database 108 described above). The CI/staging environment 405 may query the test planner module 411 for appropriate test plans and scenarios to use for the test staging application 409, and the CI/staging environment 405 may obtain such test plans and scenarios from the test planner module 411 or the shared database 413. The obtained test plans and scenarios are then applied to the test staging application 409. If the tests fail, the pipeline is blocked and defects or other information are logged in an issue tracker 415.

If the tests pass, the test staging application 409 is provided to a system integration testing (SIT) environment 417 as deployed application 419. The deployed application 419, after SIT in the SIT environment 417, may be pushed to the production stage as production-stage application 421 and is then released in production as the production application 423. A load balancer 425 monitors requests from one or more consumers 427 (e.g., client devices 104), which are routed to the production application 423. Such requests and responses, as noted above, may be monitored by the test planner module 411 and are ingested to form the test plans and scenarios stored in the shared database 413.

The test planner module 411, as noted above, is configured to monitor application request and response behavior in the application's production environment (e.g., production application 423). The test planner module 411 clusters the requests and responses into different categories to prepare one or more automatically updating test plans. The requests and responses may be clustered or categorized based on HyperText Transfer Protocol (HTTP) status codes, including: 200 OK, for request and response types that are correct with no failure, which may be utilized for testing normal operation path scenarios; 401 where unauthorized requests are made, which may be utilized for testing against security standards; 400 where a request payload was inappropriate, which may be utilized for testing failure scenarios; 404 where a path is not found, which may be utilized for testing failure scenarios; 500 where an internal error has occurred, which may be utilized for testing for resiliency and associated failure scenarios; etc. It should be noted that these status codes are presented by way of example only, and that in other embodiments various other status codes (not necessarily limited to HTTP status codes) may be captured based on the configuration of the test planner module 411.

Whenever a piece of code is checked-in to the code repository 403 by one of the software developers 401, the CI/CD pipeline begins. Unlike conventional software testing approaches where test-cases are first checked and then the code is actually deployed in a SIT environment, the software testing framework 102 first deploys the code in the CI/staging environment 405 (e.g., a staging environment before SIT environment 417) after the build and other checks. After CI/staging environment 405 deployment, the test planner module 411 will provide selected ones of the production-captured requests (e.g., monitored from the production application 423) to the CI/staging environment 405 test staging application 409 (e.g., via a CI-deployed application programming interface (API)) from various categories (e.g., such as those described above) and will monitor the responses within the CI/staging environment 405.

If variations are observed in the responses coming out of the existing components, there is a possibility of a regression defect. The selected test plans and scenarios may be configured to catch or capture particular types of defects, including but not limited to: data variations (e.g., unit/functional testing); structure variations (e.g., contract testing); status code type variations (e.g., unit/functional testing); etc. Based upon the configured variations, the CI/staging environment 405 will be able to decide if the responses represent a regression defect or not. If the responses represent a regression defect, an associated defect is logged in the issue tracker 415 (e.g., a Team Foundation Server (TFS)/Pivotal Tracker) and the relevant software development team members (e.g., one or more of the developers 401) can be notified accordingly (e.g., using host agents as described above) and the CI/CD pipeline is stopped. If the test results are correct, the code may be deployed in the SIT environment 417 as deployed application 419. Similar types of tests, if requested from the test planner module 411, may also be performed at this stage in the SIT environment 417.

The above data setup enables testing scenarios without pointing to production-like services, while testing the checked-in code in a similar setup (e.g., with test plans and scenarios generated automatically based on actual traffic for the production application 423). Since regression testing may otherwise be done after a development-lock happens, the software testing framework 102 provides an automated software testing tool that makes sure that regression defects are caught early in the release cycle (e.g., adopting a "shift-left" testing methodology). The software development framework 102 allows configuration of the intervals at which the CI/staging environment 405 testing is performed (e.g., after every code check-in, once in x hours, once in y days, etc.).

In some embodiments, the test planner module 411 is implemented as a network analyzer (e.g., a data-network packet analyzer computer program such as tcpdump) that is suitably configured to provide the functionality described herein. The test planner module 411, however, does not act as a proxy and will not affect the production application 423. Instead, the test planner module 411 may be configured to specify one or more application ports and then capture and replay incoming data on such ports. The test planner module 411 may be configured in a "single mode" where the test planner module 411 records and replays traffic from the same machine, or in a "multi-mode" where the test planner module 411 at least partially runs on a web machine or server and forwards traffic to an aggregator instance running on a separate server which can then save the data to a storage service (e.g., a cloud storage service such as Amazon S3, ElasticSearch, Kafka Streams, etc.). In some embodiments, the test planner module 411 utilizes a libpcap API or tool for intercepting traffic for most cases. If the libpcap API encounters any issues, the test planner module 411 has the capability to automatically failover to an alternative engine, such as a raw socket API or tool.

The test planner module 411 may be used for performing (perf) testing. Staging environments, such as CI/staging environment 405 may provide a "mock" environment that is an imitation of a genuine production environment and may have issues related to confirmation basis. Such mock environments, however, are useful in that a piece of code that "works in staging" may be viewed as more reliable than a piece of code that only works on a particular developer's machine. The test planner module 411, as noted above, supports perf testing capabilities in addition to its automated regression testing capabilities. In some cases, the test planner module 411 utilizes percentage-based limiters for dropping requests by slowing down or speeding up request emitting processes. For example, the following command may be used to speed up replay (e.g., doubling the speed):

Replay from file on 2× speed
tp--input-file "requests.tp1200%"--output-http "staging.com"

Extensive perf testing may also be performed using the test planner module 411 by looping the same set of files, such that when the test planner module 411 replays all the requests it does not stop but instead starts from the first request again. Thus, with only a small number of requests, the test planner module 411 is capable of doing extensive perf testing.

Various configurability options in the test planner module 411 enable a wide variety of test plans and scenarios, including options for randomization and optimization, filtering, and rewriting.

Randomization and optimization options are useful if a developer does not want to overload the test environment, especially when embedded as part of the CI/CD pipeline. Various strategies may be used for randomization and optimization, including dropping random requests, and dropping fractions of requests (e.g., based on header or uniform resource located (URL) parameter values). The strategy of dropping random requests may be limiting in absolute or relative terms. For absolute terms, if for a current second (or other time epoch) a specified request limit counter is reached, the rest of the requests may be disregarded and in the next second (or other time epoch) the request limit counter is reset. For relative (e.g., percentage) terms, a random generator may be used to decide whether to pass a request or not based on a percentage chance configured in the random generator. The strategy of dropping fractions of requests may be viewed as consistent limiting, whereby if a unique user ID (e.g., specified in or otherwise associated with an API key) is stored in a header or URL of requests, the test planner module 411 may consistently forward a specified percentage of traffic only for the fraction of user requests with that user ID or API key.

Filtering options are useful when it is desired to capture only a specific part of request and response traffic, such as specific API requests. Filtering may be performed based on various criteria, such as by URL, HTTP header values, HTTP methods, etc.

Rewriting options are useful where the test environment does not have the same data as the production environment, and it is desired to perform all actions in the context of a test user. For example, all API tokens may be rewritten to some test value. Other use cases for rewriting include toggling features on and off using customer headers, rewriting URLs if the URLs changed in a new environment, etc.

The test planner module 411 also enables or offers variations of test cases, including response type variations, data variations, and structure variations. Response type variations may be used to segregate test cases based upon the different types of response status codes received by the end users. The types of response status codes (e.g., for HTTP response codes) include: informational responses (100-199); successful responses (200-299); redirects (300-399); client errors (400-499); and server errors (500-599). Response type variations may be used as a way to enable unit/functional testing as well.

Data variations may be used for ensuring data correctness and validity, which may be a crucial part of user acceptance testing (UAT). Capturing production requests, and replaying and verifying the production requests against new code with a set of configurations ensures that inconsistencies are not leaking into the application.

Structure variations may be used for performing contract testing to assess the impact of APIs used by downstream hosts. Instead of using specific tools like PACT, the testing planner module 411 enables functionality for contract testing by deploying test case algorithms that look out for variations in the response structures and can deduce accordingly the consumers 427 impacted by performing such a scan.

As described above, illustrative embodiments provide various advantages relative to conventional software testing techniques. For example, conventional manual testing is time consuming, repetitive, and tiring for software development teams. Manual testing also has significant chances of missing certain scenarios. Conventional automation suites may use various tools (e.g., selenium/cypress) to write test cases for every aspect, but as an application evolves and grows it becomes increasingly challenging to maintain such test cases while also ensuring that the right data is used to test the application. Thus, conventional automation suites do not provide a scalable approach and require significant resources. Some embodiments implement a strangler design pattern efficiently within a CI/CD pipeline to overcome these and other disadvantages associated with conventional manual testing and conventional test automation suites.

The software testing framework described herein provides automated software testing tools that do more than simply "replay" production requests captured by monitoring a production application. For example, the software testing framework described herein provides functionality for randomization and optimization of production requests, as well enabling filtering and rewriting of the production requests. Thus, the software testing framework described herein is well-suited for use in software deployed as distributed microservices where requests and responses may be the result of multiple internal processes. Further, the intelligent algorithms driving the test planning enable selection and recommendation of the best set of test cases (e.g., from an overall corpus of test cases and scenarios) to decrease the overall CI/CD time thus making it more practical and usable. Moreover, the software testing framework described herein enables multiple forms of software testing and is not limited solely to regression testing.

In some embodiments, the software testing framework provides an intelligent and self-aware system that eliminates the need to write and maintain test cases from a developer perspective, and also eliminates the need for regression testing (manual or automated) by QEs resulting in a significant reduction in the end-to-end process of regression testing. The software testing framework further eliminates the need to write or manually test, by providing the ability to configure requirements around variations and the kind of test which a software development team wants to perform at desired intervals. The software testing framework described herein also caters to and enables various types of testing, including unit, functional, performance, contract and integration testing via a single channel with a zero-code platform. In some embodiments, the software testing framework provides the ability to process requests and responses at a network level, with multiple levels of configurability to enable such different forms of testing.

The software testing framework described herein can advantageously increase confidence in code deployments, configuration changes, and infrastructure changes, while enabling software developers to focus more on feature deliverables (rather than devoting time and effort to test case writing). Further, use of the software testing framework described herein enables QE teams to devote more time and resources on newly-developed features and functionalities and depend on the software testing framework to perform regression testing which will in turn increase the quality of applications. The software development framework described herein also enables shift-left culture in the regression testing area where regression testing will be done continuously without waiting for development-lock to happen release over release. Use of the software testing framework described herein will improve stability and quality of applications, thus ensuring improved customer satisfaction. The software testing framework described herein is also scalable and provides a non-resource required automated way of performing testing which can be adapted to wider software development teams saving a significant number of man-hours that would otherwise be devoted to regression-related testing.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for generating software testing plans based at least in part on monitored traffic from production applications will now be described in greater detail with reference to FIGS. 5 and 6. Although described in the context of system 100, these platforms may also be used to implement at least portions of other information processing systems in other embodiments.

Figure 5:
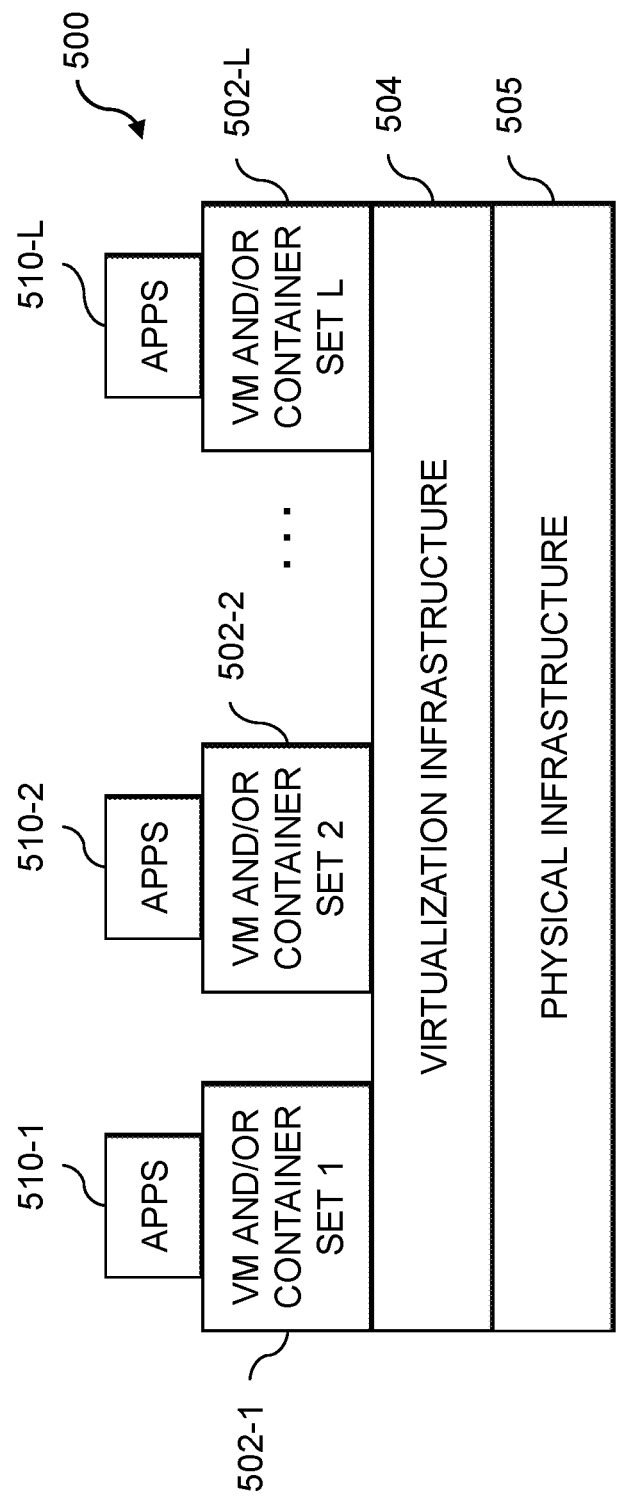
FIGS. 5 and 6 show examples of processing platforms that may be utilized to implement at least a portion of an information processing system in illustrative embodiments.
Figure 6:
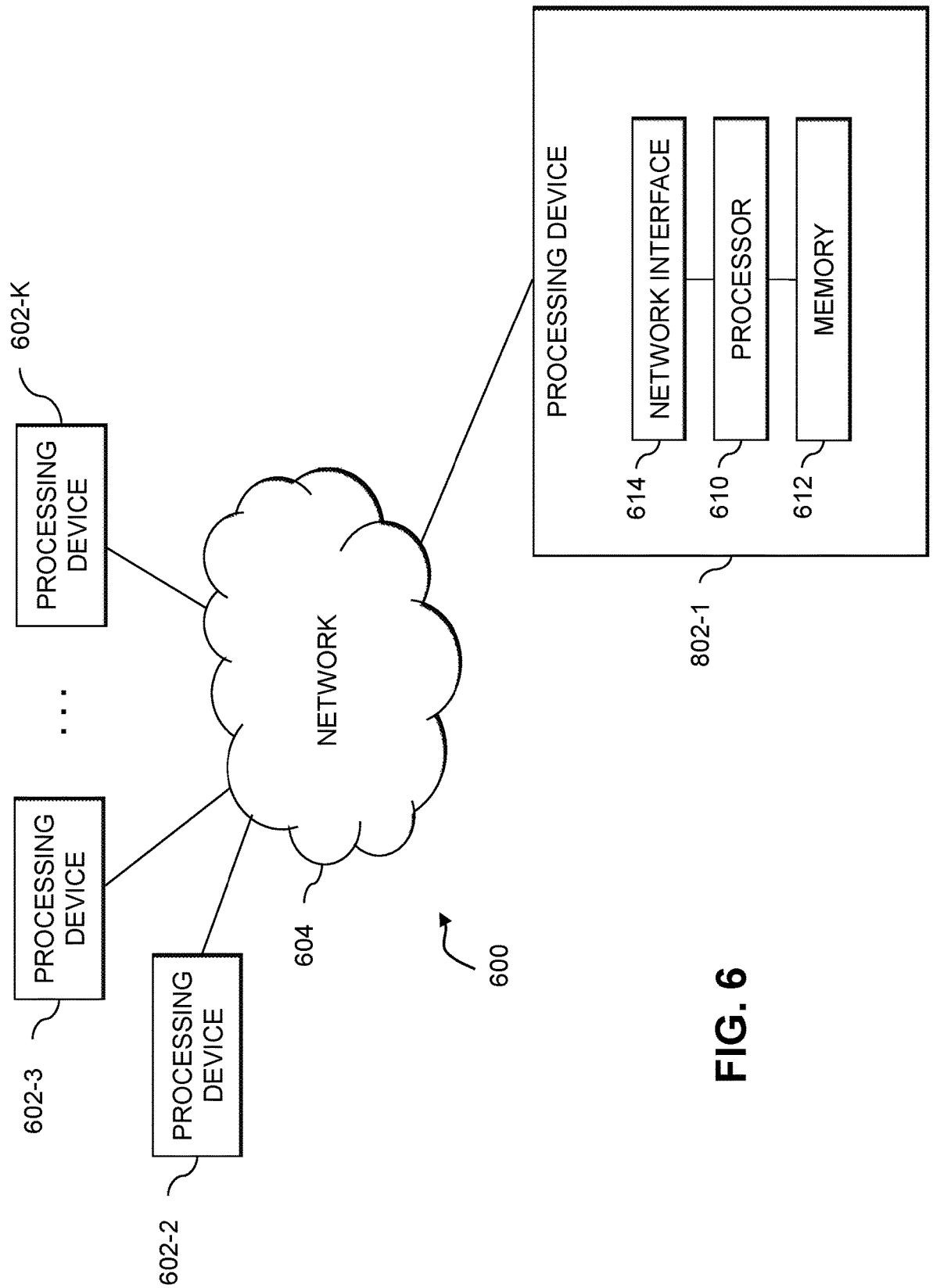

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for generating software testing plans based at least in part on monitored traffic from production applications as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, software, test patterns and scenarios, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   monitoring traffic associated with a production application in a production environment of a software development platform;
   generating software testing plans based at least in part on the monitored traffic;
   identifying software code to be tested for an updated version of the production application;
   selecting one or more of the software testing plans for testing the identified software code in a staging environment of the software development platform prior to integration testing of the updated version of the production application in an integration testing environment of the software development platform;

performing the selected one or more software testing plans on the identified software code in the staging environment of the software development platform; and deploying the identified software code in the updated version of the production application in the integration testing environment of the software development platform based at least in part on results of performing the selected one or more software plans on the identified software code in the staging environment of the software development platform;

wherein generating the software testing plans comprises:

generating a first software plan based at least in part on a first subset of the monitored traffic, the first software testing plan for testing a first type of behavior of the production application; and generating one or more additional software testing plans, including at least a second software testing plan based at least in part on a second subset of the monitored traffic, the second software testing plan for testing a second type of behavior of the production application.

2. The apparatus of claim 1 wherein the monitored traffic comprises a plurality of requests sent to the production application and a plurality of responses sent from the production application, the selected one or more software testing plans comprise a set of test requests corresponding to at least a subset of the plurality of requests sent to the production application and a set of expected responses corresponding to at least a subset of the plurality of responses sent from the production application, and wherein the results of performing the selected one or more software plans on the identified software code in the staging environment indicate whether actual responses to the set of test requests differ from the set of expected responses.

3. The apparatus of claim 1 wherein monitoring the traffic associated with the production application in the production environment of the software development platform comprises clustering requests and responses into a plurality of categories, and wherein generating the software testing plans comprises generating at least one software testing plan for each of the plurality of categories.

4. The apparatus of claim 3 wherein the requests and responses are clustered into the plurality of categories based at least in part on HyperText Transfer Protocol (HTTP) status codes of the requests and responses.

5. The apparatus of claim 3 wherein the plurality of categories comprise two or more of:

a first category comprising successful requests and responses, the first category being utilized to generate one or more software testing plans for testing normal operation of an application;

a second category comprising unauthorized requests and responses, the second category being utilized to generate one or more software testing plans for testing against security standards;

a third category comprising requests and responses with inappropriate request payload, the third category being utilized to generate one or more software testing plans for testing failure scenarios;

a fourth category comprising requests and responses where a path is not found, the fourth category being utilized to generate one or more software testing plans for testing failure scenarios; and a fifth category comprising requests and responses where an internal error occurred, the fifth category being utilized to generate one or more software testing plans for testing for resiliency and associated failure scenarios.

6. The apparatus of claim 1 wherein performing the selected one or more software testing plans on the identified software code in the staging environment of the software development platform comprises replaying, in a test staging application in the staging environment, one or more requests sent to the production application in the monitored traffic.

7. The apparatus of claim 6, wherein performing the selected one or more software testing plans on the identified software code in the staging environment of the software development platform further comprises identifying regression defects in the identified software code based at least in part on determining whether responses to the replayed one or more requests from the test staging application in the staging environment differ from corresponding responses in the monitored traffic sent from the production application in the production environment.

8. The apparatus of claim 6 wherein selecting the one or more software testing plans comprises selecting the replayed one or more requests to capture one or more designated types of regression defects based at least in part on a type of testing being performed on the identified software code.

9. The apparatus of claim 8 wherein the one or more designated types of regression defects comprises at least one of:

data variations for unit or functional testing of the identified software code;

structure variations for contract testing of the identified software code; and status code type variations for unit or functional testing of the identified software code.

10. The apparatus of claim 6 wherein replaying the one or more requests in the test staging application in the staging environment comprises at least one of:

dropping a subset of requests in the monitored traffic sent to the production application;

adjusting a rate at which requests in the monitored traffic sent to the production application are replayed in the test staging application; and looping replay of a set of two or more requests in the monitored traffic sent to the production application in the test staging application.

11. The apparatus of claim 6 wherein the one or more requests replayed in the test staging application in the staging environment are selected from the monitored traffic based at least in part on dropping random requests from the monitored traffic.

12. The apparatus of claim 6 wherein the one or more requests replayed in the test staging application in the staging environment are selected from the monitored traffic based at least in part on dropping a fraction of requests from the monitored traffic.

13. The apparatus of claim 6 wherein the one or more requests replayed in the test staging application in the staging environment are selected from the monitored traffic based at least in part on applying one or more filters to the monitored traffic.

14. The apparatus of claim 6 wherein the one or more requests replayed in the test staging application in the staging environment comprise modified versions of requests from the monitored traffic.

15. A computer program product comprising a non-transitory processor-readable storage medium having stored therein program code of one or more software programs, wherein the program code when executed by at least one processing device causes the at least one processing device to perform steps of:

monitoring traffic associated with a production application in a production environment of a software development platform;

generating software testing plans based at least in part on the monitored traffic;

identifying software code to be tested for an updated version of the production application;

selecting one or more of the software testing plans for testing the identified software code in a staging environment of the software development platform prior to integration testing of the updated version of the production application in an integration testing environment of the software development platform;

performing the selected one or more software testing plans on the identified software code in the staging environment of the software development platform; and deploying the identified software code in the updated version of the production application in the integration testing environment of the software development platform based at least in part on results of performing the selected one or more software plans on the identified software code in the staging environment of the software development platform;

wherein generating the software testing plans comprises:

generating a first software plan based at least in part on a first subset of the monitored traffic, the first software testing plan for testing a first type of behavior of the production application; and generating one or more additional software testing plans, including at least a second software testing plan based at least in part on a second subset of the monitored traffic, the second software testing plan for testing a second type of behavior of the production application.

16. The computer program product of claim 15 wherein the monitored traffic comprises a plurality of requests sent to the production application and a plurality of responses sent from the production application, the selected one or more software testing plans comprise a set of test requests corresponding to at least a subset of the plurality of requests sent to the production application and a set of expected responses corresponding to at least a subset of the plurality of responses sent from the production application, and wherein the results of performing the selected one or more software plans on the identified software code in the staging environment indicate whether actual responses to the set of test requests differ from the set of expected responses.

17. The computer program product of claim 15 wherein performing the selected one or more software testing plans on the identified software code in the staging environment of the software development platform comprises replaying, in a test staging application in the staging environment, one or more requests sent to the production application in the monitored traffic.

18. A method comprising:

monitoring traffic associated with a production application in a production environment of a software development platform;

generating software testing plans based at least in part on the monitored traffic;

identifying software code to be tested for an updated version of the production application;

selecting one or more of the software testing plans for testing the identified software code in a staging environment of the software development platform prior to integration testing of the updated version of the production application in an integration testing environment of the software development platform;

performing the selected one or more software testing plans on the identified software code in the staging environment of the software development platform; and deploying the identified software code in the updated version of the production application in the integration testing environment of the software development platform based at least in part on results of performing the selected one or more software plans on the identified software code in the staging environment of the software development platform;

wherein generating the software testing plans comprises:

generating a first software plan based at least in part on a first subset of the monitored traffic, the first software testing plan for testing a first type of behavior of the production application; and generating one or more additional software testing plans, including at least a second software testing plan based at least in part on a second subset of the monitored traffic, the second software testing plan for testing a second type of behavior of the production application; and wherein the method is performed by at least one processing device comprising a processor coupled to a memory.

19. The method of claim 18 wherein the monitored traffic comprises a plurality of requests sent to the production application and a plurality of responses sent from the production application, the selected one or more software testing plans comprise a set of test requests corresponding to at least a subset of the plurality of requests sent to the production application and a set of expected responses corresponding to at least a subset of the plurality of responses sent from the production application, and wherein the results of performing the selected one or more software plans on the identified software code in the staging environment indicate whether actual responses to the set of test requests differ from the set of expected responses.

20. The method of claim 18 wherein performing the selected one or more software testing plans on the identified software code in the staging environment of the software development platform comprises replaying, in a test staging application in the staging environment, one or more requests sent to the production application in the monitored traffic.

\* \* \* \* \*